United States Patent
Dyck (10) Patent No.: US 8,452,948 B2
(45) Date of Patent: May 28, 2013

(54) HYBRID COMPARE AND SWAP/PERFORM LOCKED OPERATION QUEUE ALGORITHM

(75) Inventor: Greg A. Dyck, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 12/825,242

(22) Filed: Jun. 28, 2010

(65) Prior Publication Data

US 2011/0320780 A1 Dec. 29, 2011

(51) Int. Cl.
*G06F 9/00* (2006.01)
(52) U.S. Cl.
USPC ............................ 712/229; 711/150; 711/152
(58) Field of Classification Search
None
See application file for complete search history.

(56) References Cited

U.S. PATENT DOCUMENTS

| 4,584,640 | A | * | 4/1986 | MacGregor et al. ............... 1/1 |
| 5,893,157 | A | * | 4/1999 | Greenspan et al. ........... 711/150 |
| 5,895,492 | A |   | 4/1999 | Greenspan et al. |
| 5,895,494 | A |   | 4/1999 | Scalzi et al. |
| 6,128,710 | A | * | 10/2000 | Greenspan et al. ........... 711/152 |
| 6,976,260 | B1 |   | 12/2005 | Ault et al. |
| 2007/0260826 | A1 | * | 11/2007 | Greiner et al. ............... 711/154 |
| 2009/0158012 | A1 |   | 6/2009 | Hansen et al. |
| 2009/0327658 | A1 |   | 12/2009 | Greiner et al. |

OTHER PUBLICATIONS

IBM (z/OS Version 1 Release 12 Implementation); Redbooks; First Edition, Apr. 2011, pp. 1 and 513.*

* cited by examiner

*Primary Examiner* — Keith Vicary
(74) *Attorney, Agent, or Firm* — Patterson & Sheridan, LLP (57) ABSTRACT

Systems, methods, and computer program products are disclosed for intermixing different types of machine instructions. One embodiment of the invention provides a protocol for intermixing the different types of machine instructions. By adhering to the protocol, different types of machine instructions may be intermixed to concurrently update data structures without leading to unpredictable results.

20 Claims, 8 Drawing Sheets

```
Restart    LM    R2,R3,QueueCtl(R1)                      Get the current queue control data
           LTR   R3,R3                                    Does one element exist
           JZ    Complete                                 No, we are done
           TMLH  R2,X'8000'                               Test if CDS is allowed or not
           JNZ   UsePLO                                   On - CDS is disabled, use PLO
           LR    R4,R2                                    Copy current sequence number
           OILH  R4,X'8000'                               Set CDS is disabled
           LR    R5,R3                                    Copy current element address
           CDS   R2,R4,QueueCtl                           Update using CDS
           JNZ   Restart                                  Update failed, so restart
*                                                         Update succeeded, CDS is now disabled
UsePLO     LA    R0,0                                     Set compare and load code
           PLO   R2,QueueCtlSeq(R1),R4,ElementNext(R5)    Load using PLO
           JNZ   Restart                                  Load failed, so restart
           LTR   R4,R4                                    Does another element exist
           JZ    Complete                                 No, we are done
           C     R4,RemoveElement                         Is this the element to remove?
           JE    Removeit                                 Yes
           LR    R5,R4                                    No, make this element the current one
           J     UsePLO                                   Try again
Removeit   PLO   R2,QueueCtlSeq(R1),R4,ElementNext(R4)    Load using PLO
           LA    R0,12                                    Set compare and swap and store
           LR    R3,R2                                    Copy current sequence number
           AHI   R3,1                                     Increment it by 1 - queue changed
           NILH  R3,X'7FFF'                               Enable CDS again
           PLO   R2,QueueCtlSeq(R1),R4,ElementNext(R5)    Update using PLO
           JZ    Complete                                 Update succeeded, we are done
           LM    R2,R3,QueueCtl(R1)                       Get the current queue control data
           J     Restart                                  Update failed, so restart
Complete   ...
```

FIG. 8

HYBRID COMPARE AND SWAP/PERFORM LOCKED OPERATION QUEUE ALGORITHM

BACKGROUND

1. Field

Embodiments of the invention relate generally to techniques for processing machine instructions and more specifically to intermixing different types of machine instructions.

2. Description of the Related Art

Computer processors may support different types of machine instructions for manipulating data structures. For example, a computer processor may support a first type of machine instruction for efficiently manipulating data at the head of a queue. However, using the first type of machine instruction to manipulate data not at the head of the queue—or to access data at any position in the queue—may require obtaining serialization, which may be costly in some cases in terms of performance. Further, the computer processor may support a second type of machine instruction for manipulating or accessing data at any position in the queue. However, the second type of machine instruction may have a higher execution cost, relative to the first type of machine instruction. Further, intermixing the first type of machine instruction and the second type of machine instruction to concurrently update the queue may lead to unpredictable results in some cases.

SUMMARY

Embodiments of the invention provide a computer-implemented method, computer program product, and system for performing operations for intermixing conditional swapping (CNS) instructions and Perform Locked Operation (PLO) instructions. The operations may generally include executing a CNS instruction to set a PLO/CNS mode flag to a PLO mode, wherein the PLO/CNS mode flag specifies a predefined set of instructions for updating a header of a queue. The operations may also include incrementing a sequence value upon determining that a serializing update is made to the queue. The operations may also include executing a PLO instruction to retrieve data from the queue in the PLO mode based on the sequence value.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally provide techniques for intermixing, in an application, different types of machine instructions supported by a computer processor. Each type of machine instruction may operate on a data structure supported by the computer processor. Further, one embodiment of the invention provides a protocol for intermixing the different types of machine instructions. The protocol may specify a manner in which to intermix the different types of machine instructions. More specifically, the protocol may specify one or more constraints to be fulfilled when intermixing the different types of machine instructions in the application, in order to avoid unpredictable results from intermixing the different types of machine instructions. By adhering to the protocol, the application may intermix different types of machine instructions to concurrently manipulate a given data structure, without leading to unpredictable results in updating the data structure. Accordingly, the application may intermix the different types of machine instructions to more efficiently access and/or manipulate the data structures and hence, execute more efficiently.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
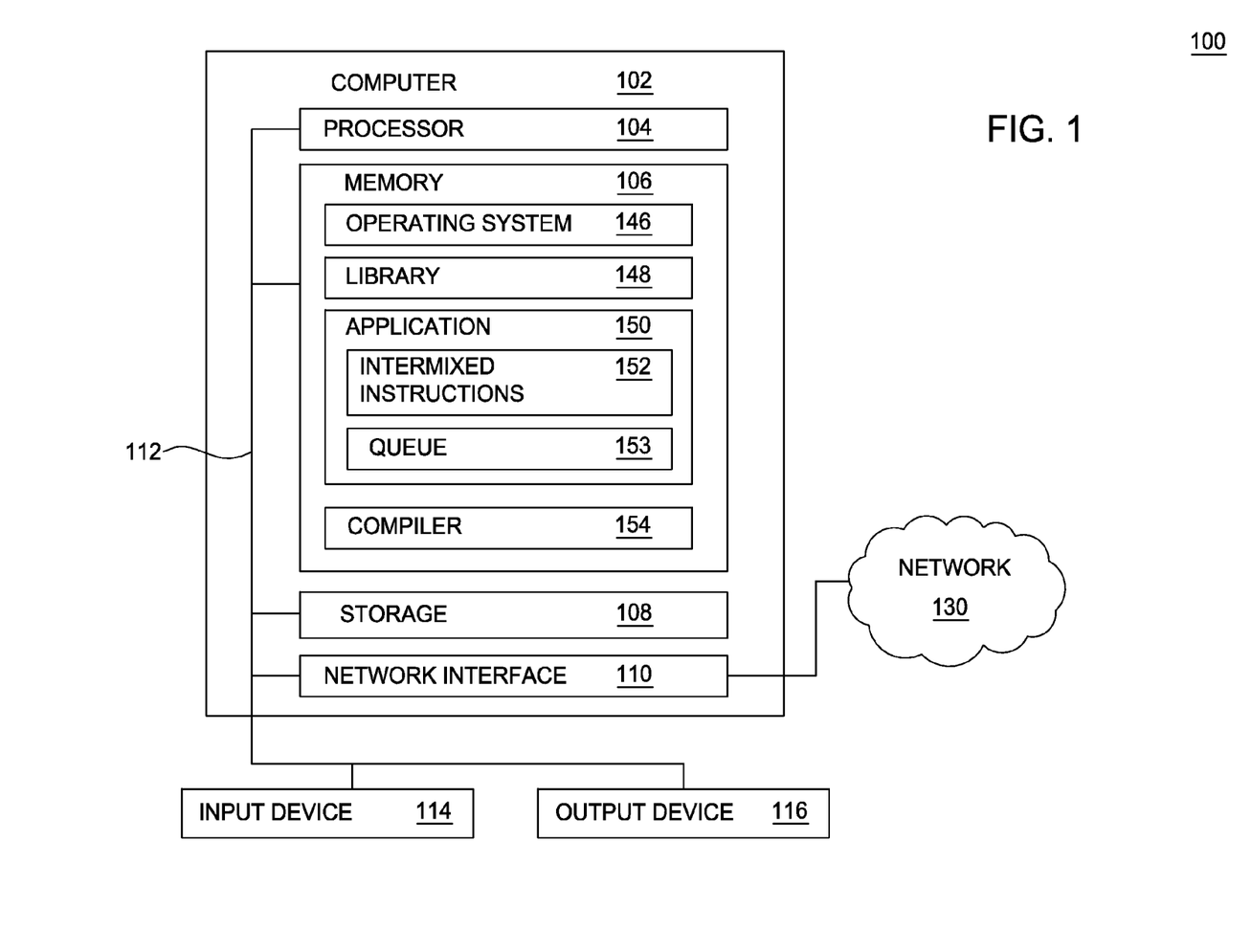
FIG. 1 is a block diagram illustrating a system for intermixing different types of machine instructions, according to one embodiment of the invention.

FIG. 1 is a block diagram illustrating a system 100 for intermixing different types of machine instructions, according to one embodiment of the invention. The networked system 100 includes a computer 102. The computer 102 may also be connected to other computers via the network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system 146. Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes the operating system 146, a library 148, an application 150, and a compiler 154. The compiler 154 transforms source code written in a programming language into object code. A linker (not shown) may combine one or more separate files of object code into an executable program, such as the application 150. The library 148 may be a collection of subroutines and/or classes that provide services to the application 150. For example, the library 148 may implement an application programming interface (API) for use by the application 150.

In one embodiment, the operating system 146, the libraries 148, the application 150, and/or the compiler 154 cause the processor 104 to execute machine instructions of the application 150 according to a protocol for intermixing different types of machine instructions supported by the processor 104. Accordingly, the application 150 includes intermixed instructions 152, which are further described below in conjunction with FIGS. 2-3, and a data structure being modified by the intermixed instructions 152. In this particular example, the data structure is the queue 153. The queue 153 may be managed by the application 150 and may be a first-in, first-out (FIFO) data structure for storing data elements for the application 150. In alternative embodiments, the data structure may be of other queue types, such as last-in, first-out (LIFO), single-threaded, double-threaded, etc. In other alternative embodiments, the data structure may be a linked list or other list, a hash table, an associative array or other array, a set, a bag, a tree, a graph, or any other data structure.

In one embodiment, one type of machine instruction supported by the processor 104 is a conditional swapping (CNS) instruction. The conditional swapping instruction may be a compare and swap (CS) instruction or a compare double and swap (CDS) instruction. A CS or CDS instruction may be used in multiprogramming or multiprocessing environments to serialize access to counters, flags, control words, and other storage areas. In other words, the CS or CDS instruction may be used to support concurrent programming techniques. The CDS instruction may operate on operands that are twice the size of operands of the CS instruction. For example, if operands to the CS instruction are 32 bits in length, operands to the CDS instruction may be 64 bits in length. Further, if operands to the CS instruction are a word in storage, operands to the CDS instruction may be a double-word in storage. Further, 32-bit variants, 64-bit variants, and other variants of CNS instructions are broadly contemplated.

In one embodiment, the CS or CDS instruction may include one opcode and three operands: a memory location, a "compare" value, and a "swap" value. The CS or CDS instruction may atomically compare contents of a specified memory location (the first operand) to a specified "compare" value (the second operand). If the contents of the memory location do not match the specified value, the CS or CDS instruction modifies the contents of the memory location to a specified "swap" value (the third operand). The result of the instruction may indicate whether the instruction performed the modification. For example, the CS or CDS instruction may return a boolean response or return the original contents of the memory location (i.e., the swapped-out value).

As described above, in one embodiment, the CS or CDS instruction may be used to support concurrent programming techniques. Concurrent programs may be applications designed for concurrent execution by one or more computer processors. Two or more concurrent programs may be executed sequentially on a single processor by interleaving the execution steps of each computational process. Alternatively, concurrent programs may be executed in parallel by assigning each concurrent program to a separate computer processor (e.g., on a single machine or over a network). A number of different methods can be used to implement concurrent programs, such as implementing each concurrent program as an operating system process, or implementing each concurrent program as a set of threads within a single operating system process.

In one embodiment, another type of machine instruction supported by the processor 104 is a perform locked operation (PLO) instruction. The PLO instruction may be used in multiprogramming or multiprocessing environments to perform compare, load, compare-and-swap, and store operations on two or more discontiguous locations that can be words or double-words. These operations may be performed as an atomic set of operations under control of a lock that is held only for a duration of an execution of a single PLO instruction (as opposed to across the execution of multiple instructions). Accordingly, the PLO instruction may be used to support concurrent programming techniques.

In one embodiment, the PLO instruction may effectively perform concurrent interlocked updates of multiple operands. However, the PLO instruction may not actually perform any interlocked update, and a serially reusable resource may not be updated predictably through the use of both PLO instructions and conditional swapping instructions. For example, assume that the processor 104 concurrently executes a CS instruction and a PLO instruction. Further, assume that the CS instruction is executed to add elements to the head of a queue and that the PLO instruction is executed to remove elements from the queue. Because execution of the PLO instruction does not take into account that the queue header is updated by the CS instruction, unpredictable behavior may result—namely, the PLO instruction may store outdated data into the queue header in this particular example.

As described above, intermixing PLO instructions and conditional swapping instructions on the queue by the application 150 may lead to unpredictable behavior of the application 150 in some cases. In one embodiment, a protocol for intermixing PLO instructions and conditional swapping instructions is provided. The application 150 may adhere to the protocol to predictably update the serially reusable resource while intermixing PLO instructions and conditional swapping instructions. For example, if the application 150 is implemented as separate operating system processes, each operating system process may adhere to the protocol. Alternatively, if the application 150 is implemented as separate threads of a single operating system process, each thread may adhere to the protocol. The protocol for intermixing PLO instructions and conditional swapping instructions is further described below in conjunction with FIGS. 2-6.

In one embodiment, the conditional swapping instructions may be used to efficiently manipulate elements at the head of the queue 153. However, using the conditional swapping instructions to manipulate data not at the head of the queue 153—or to access data at any position in the queue 153—may require obtaining serialization, which may be costly in some cases in terms of performance of the application 150. Further, PLO instructions may be used to manipulate or access data at any position in the queue 153. However, PLO instructions may have a higher execution cost, relative to conditional swapping instructions.

In one embodiment, by adhering to the protocol for intermixing PLO instructions and conditional swapping instructions, the application 150 may use conditional swapping instructions to efficiently manipulate data at the head of the queue 153 and PLO instructions for performing other operations on the queue 153, thereby avoiding obtaining serialization and any performance penalties associated therewith.

While embodiments are described herein with reference to the application 150 adhering to the protocol for intermixing PLO instructions and conditional swapping instructions, those skilled in the art will recognize that the techniques described herein may be implemented by the library 148, the operating system 146, the compiler 154, and/or the application 150. For example, the compiler 154 may be configured to convert source code written in a high-level programming language into object code that includes intermixed PLO instructions and conditional swapping instructions according to the protocol. In another embodiment, the library 148 and/or the operating system 146 encapsulates functionality of intermixing the PLO instructions and conditional swapping instructions according to the protocol and exposes an API for use by the application 150. Other embodiments for intermixing PLO instructions and conditional swapping instructions according to the protocol are broadly contemplated.

Figure 2:
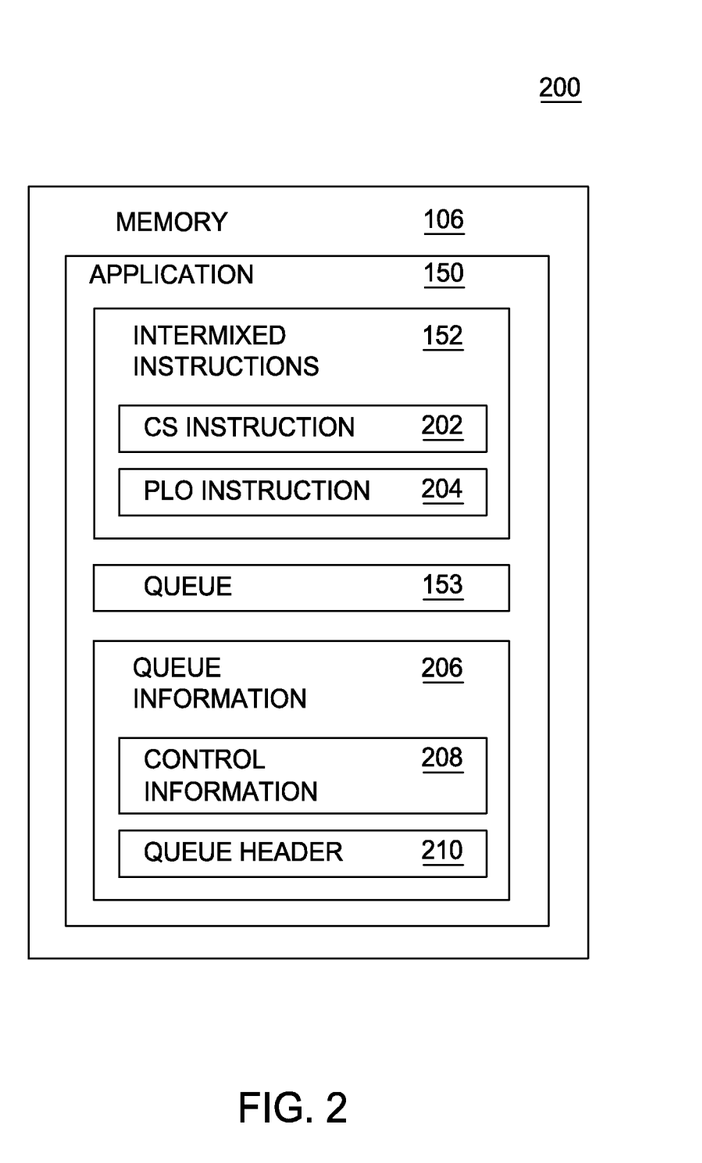
FIG. 2 illustrates an application that adheres to the protocol for intermixing PLO instructions and conditional swapping instructions, according to one embodiment of the invention.

FIG. 2 illustrates an example 200 of the application 150 adhering to the protocol for intermixing PLO instructions and conditional swapping instructions, according to one embodiment of the invention. In this particular example 200, the intermixed instructions 152 include a CS instruction 202 and a PLO instruction 204. The protocol may specify for the application 150 to maintain queue information. Accordingly, the memory 106 also includes queue information 206 maintained by the application 150, as specified by the protocol. The queue information 206 includes control information 208 and a queue header 210.

Figure 3:
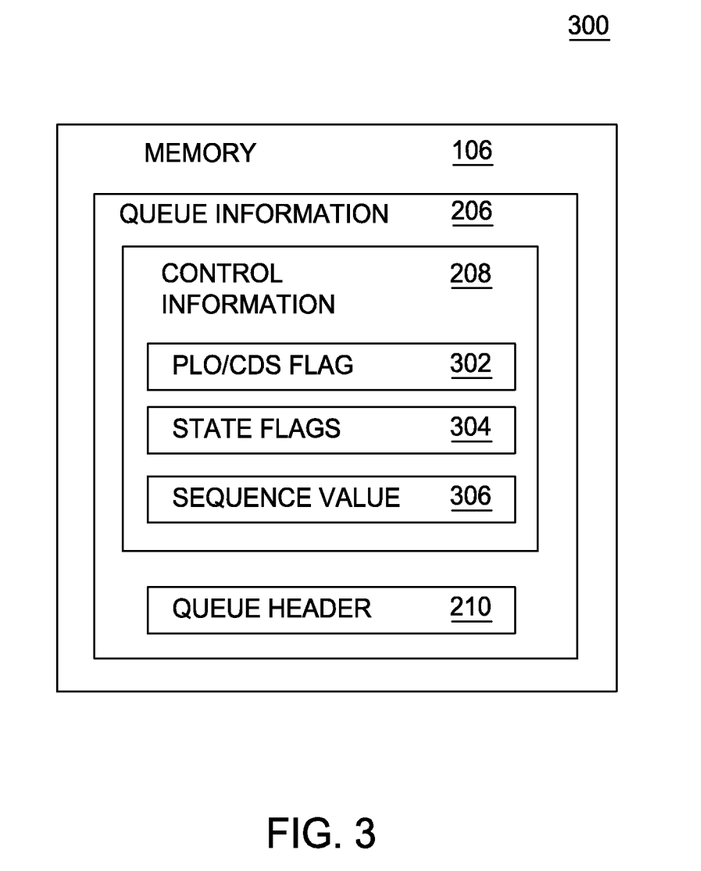
FIG. 3 illustrates control information and a queue header as specified by the protocol, according to one embodiment of the invention.

As described above, in one embodiment, the application 150 may maintain the control information 208 and the queue header 210. FIG. 3 illustrates an example 300 of the control information 208 and the queue header 210, according to one embodiment of the invention. As shown in the example 300, the control information 208 includes a PLO/CDS flag 302, one or more state flags 304, and a sequence value 306. Assume that it is desired to intermix different types of machine instructions for manipulating a data structure, such as a queue. In one embodiment, the queue header 210 identifies the head of the queue 153. The PLO/CDS flag 302 specifies the type of machine instruction that is used to update the queue header 210.

In one embodiment, the protocol for intermixing the different types of machine instructions may specify for the application 150 to use conditional swapping instructions for all updates of the queue 153, when in CDS mode. The protocol may also specify to check the PLO/CDS flag before executing each conditional swapping instruction. The protocol may also specify to use a conditional swapping instruction to update the PLO/CDS flag, in order to switch from CDS mode to PLO mode. The protocol may also specify to use a PLO instruction to update the PLO/CDS flag, in order to switch from the PLO mode to the CDS mode.

In one embodiment, the protocol for intermixing the different types of machine instructions may specify for the application 150 to maintain one or more state flags 304, based on an implementation of the queue 153. The state flags may specify how elements on the queue are processed. For example, the state flags may include a first state flag specifying whether exclusive control is held by a specific process or thread. The state flags may also include a second state flag specifying whether an exclusive waiting process or thread exists. The state flags may also include a third state flag specifying whether to queue new waiting processes or threads to follow an existing waiting process or thread.

In one embodiment, the protocol for intermixing the different types of machine instructions may specify for the application 150 to maintain the sequence value 306. The sequence number may be used by PLO instructions as a consistency token. When the sequence number in the header is updated, any PLO instructions that are performed using a different sequence number are blocked from completing a store or load request, and processing restarts from the beginning of the queue using the updated sequence number. The protocol may specify to modify the sequence value 306 whenever the application 150 makes a serializing update to the queue 153. The protocol may specify that the serializing update includes: adding an element in PLO mode to a position other than the head of the queue 153, removing an element in PLO mode from a position other than the head of the queue 153, or switching from PLO mode to CDS mode. The protocol may also specify that the serializing update does not include: adding a data element to the head of the queue 153, removing a data element from the head of the queue 153, or switching from CDS mode to PLO mode.

In one embodiment, the protocol for intermixing the different types of machine instructions may specify for the application 150 to use PLO mode (i.e., instead of obtaining a latch to serialize the queue), in order to fetch data from the queue 153. Further, the protocol may specify that if the PLO/CDS flag 302 is not set to PLO mode, then the application 150 must first use a conditional swapping instruction to update the PLO/CDS flag 302 to PLO mode, before executing PLO instructions.

By adhering to the protocol for intermixing the different types of machine instructions, the application 150 may intermix the different types of machine instructions without creating unpredictable results when updating data structures. Advantageously, the application may intermix the different types of machine instructions to more efficiently access and/or manipulate data structures and thereby execute more efficiently.

Figure 4:
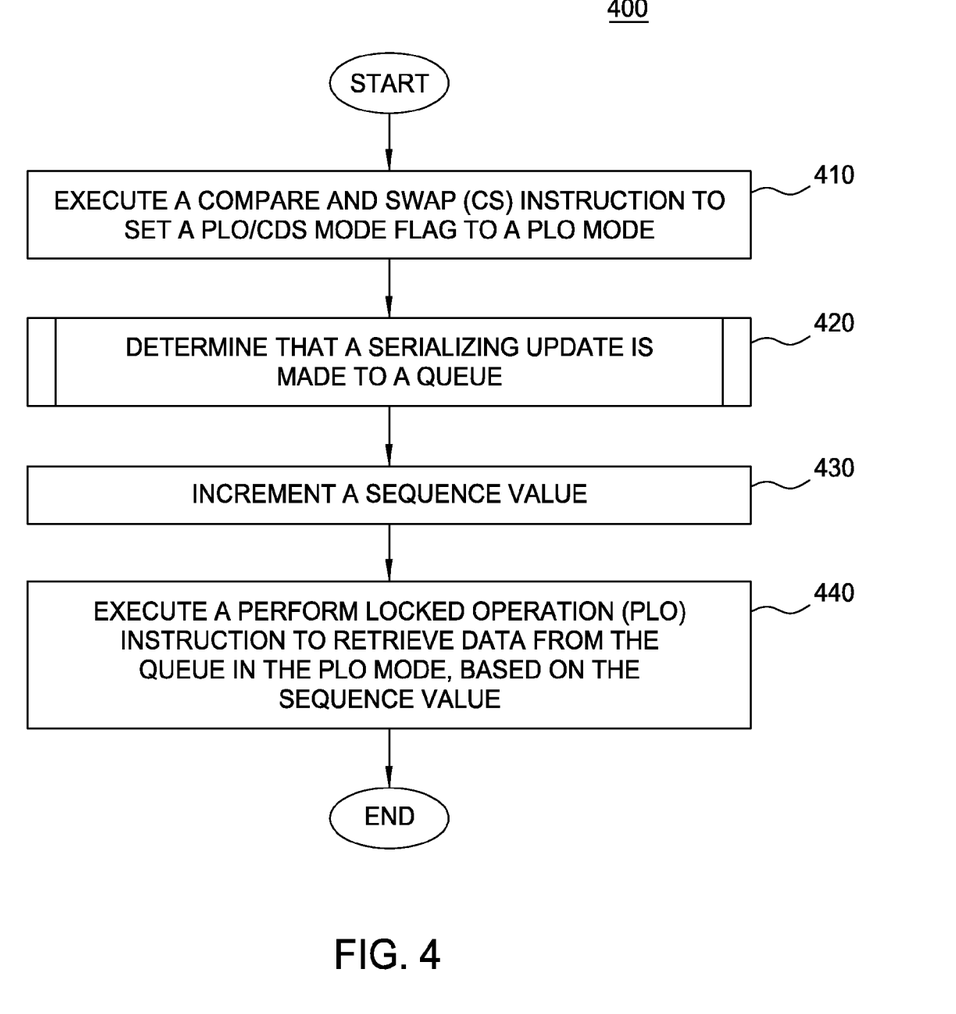
FIG. 4 is a flowchart depicting a method for intermixing PLO instructions and conditional swapping instructions, according to one embodiment of the invention.

FIG. 4 is a flowchart depicting a method 400 for intermixing PLO instructions and conditional swapping instructions, according to one embodiment of the invention. As shown, the method 400 begins at step 410, where the application 150 executes a CS instruction to set a PLO/CDS mode flag to a PLO mode. At step 420, the application 150 may determine that a serializing update is made to a queue. The step 420 is further described below in conjunction with FIG. 5. At step 430, the application 150 may update a sequence value, upon determining that the serializing update is made to the queue. For example, the application 150 may increment the sequence value 306 in the control information 208 of FIG. 3. At step 440, the application executes a PLO instruction to retrieve data from the queue in the PLO mode, based on the sequence value. After the step 440, the method 400 terminates.

Figure 5:
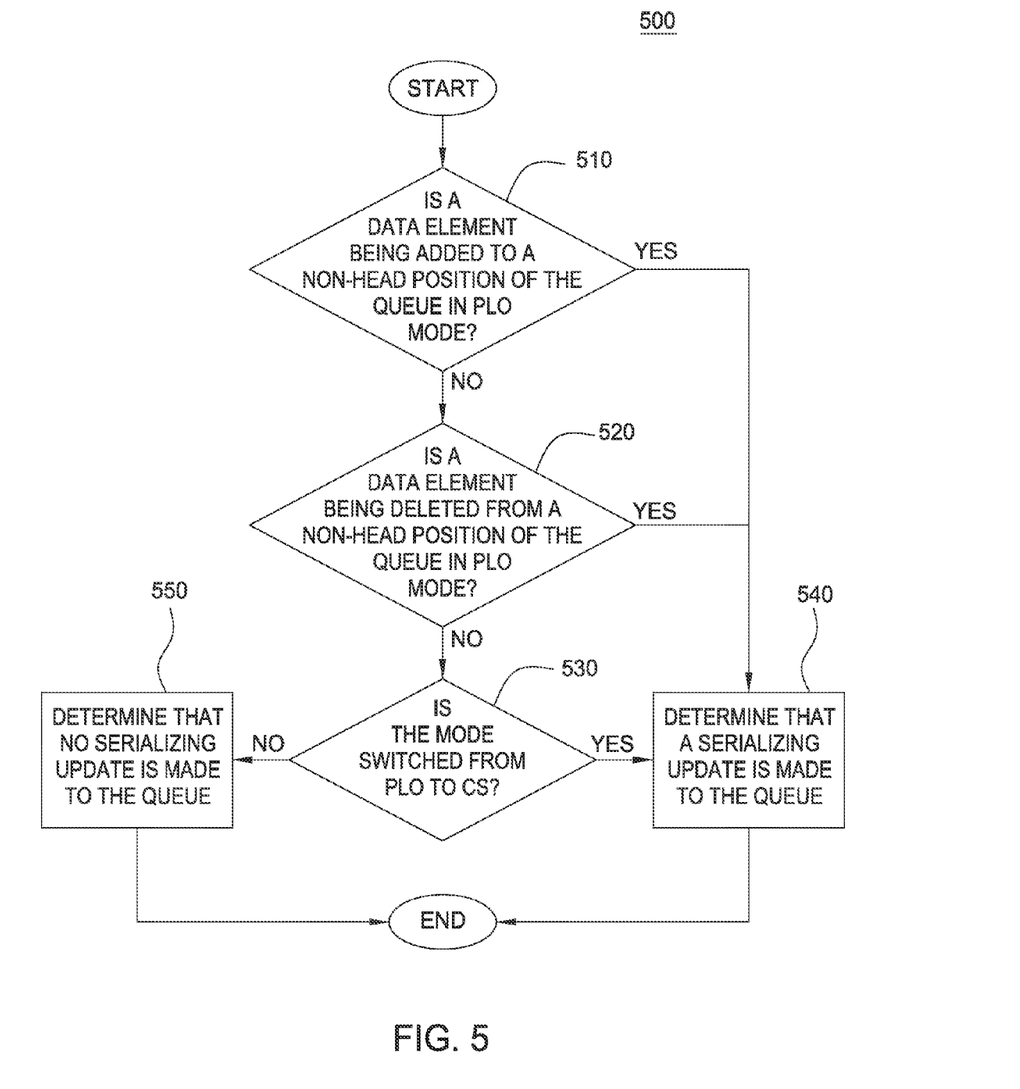
FIG. 5 is a flowchart depicting a method for determining that a serializing update is made to a queue, according to one embodiment of the invention.

FIG. 5 is a flowchart depicting a method 500 for determining that a serializing update is made to a queue, according to one embodiment of the invention. The method 500 corresponds to the step 420 of FIG. 4. As shown, the method 500 begins at step 510, where the application 150 determines whether a data element is being added in PLO mode to a non-head position of the queue. If not, at step 520, the application 150 determines whether a data element is being deleted in PLO mode from a non-head position of the queue. If not, at step 530, the application 150 determines whether the mode is being switched from PLO to CS. If not, at step 550, the application 150 determines that no serializing update is being made to the queue.

On the other hand, in one embodiment, if a positive determination is made in any of the steps 510, 520, or 530, then at step 540, the application 150 determines that a serializing update is being made to the queue. Upon determining that the serializing update is being made to the queue, the application 150 may also update the sequence value. After the steps 540 or 550, the method 500 terminates.

Figure 6:
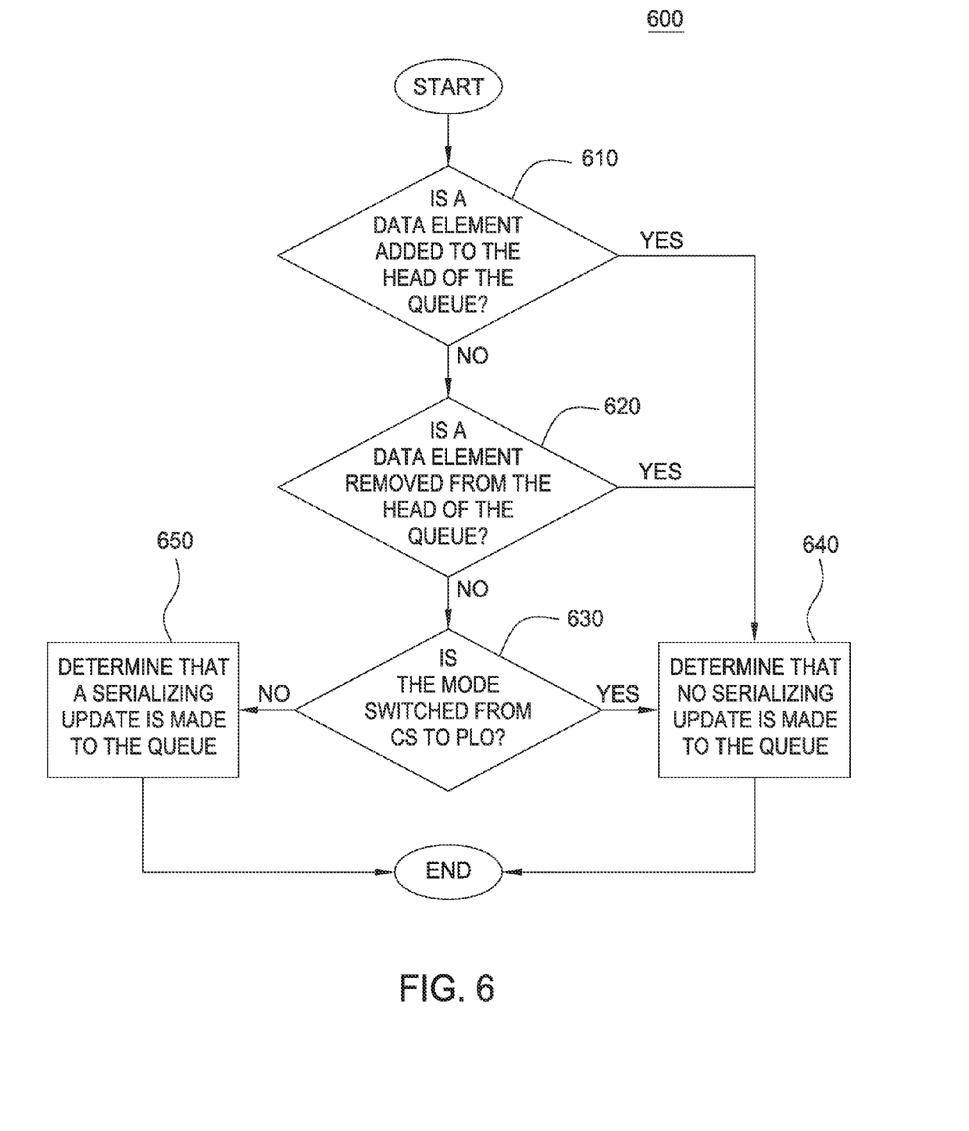
FIG. 6 is a flowchart depicting another method for determining that a serializing update is made to a queue, according to one embodiment of the invention.

FIG. 6 is a flowchart depicting another method 600 for determining that a serializing update is made to a queue, according to one embodiment of the invention. The method 600 corresponds to the step 420 of FIG. 4. In some embodiments, steps of the methods 500 and 600 may be combined to perform the step 420 of FIG. 4. As shown, the method 600 begins at step 610, where the application 150 determines whether a data element is being added to the head of the queue (regardless of PLO or CDS mode). If not, at step 620, the application 150 determines whether a data element is being removed from the head of the queue (again, regardless of PLO or CDS mode). If not, at step 630, the application 150 determines whether the mode is being switched from CS to PLO. If not, at step 650, the application 150 determines that a serializing update is being made to the queue.

In one embodiment, upon determining that the serializing update is being made to the queue, the application 150 may also update the sequence value. On the other hand, if a positive determination is made in any of the steps 610, 620, or 630, then at step 640, the application 150 determines that a serializing update is not being made to the queue. After the steps 640 or 650, the method 600 terminates.

Figure 7:
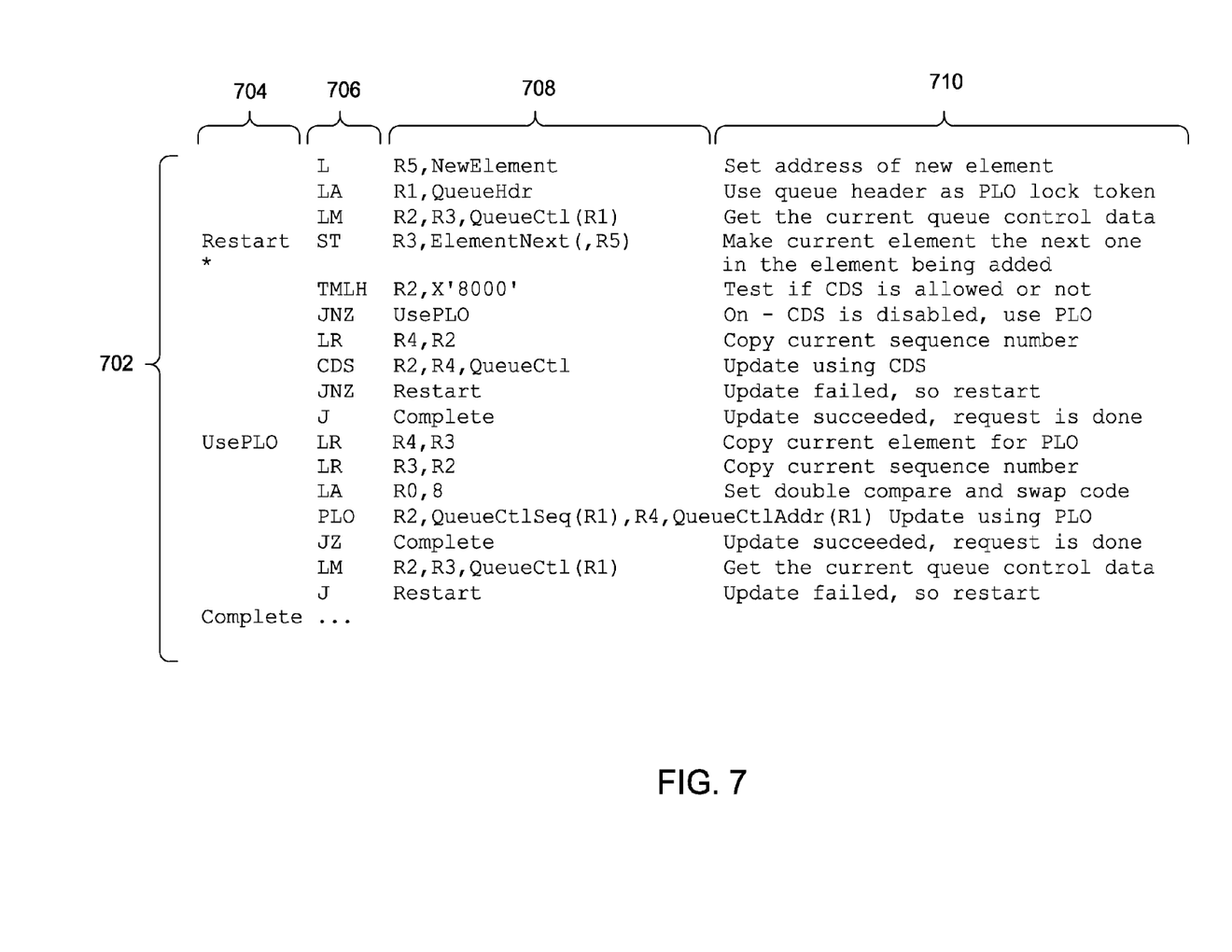
FIG. 7 illustrates an exemplary portion of the application, for adding an element to a head of a queue, according to one embodiment of the invention.

FIG. 7 illustrates an exemplary portion 702 of the application 150, for adding an element to a head of a queue, according to one embodiment of the invention. As shown, the exemplary portion 702 is expressed in assembly language. A utility program such as an assembler may be used to translate assembly language statements into machine instructions for the processor 104. The exemplary portion 702 of the application 150 includes destination labels 704, opcodes 706, operands 708, and associated descriptions 710. The exemplary portion 702 adds the element to the head of the queue based on the protocol for intermixing PLO and conditional swapping instructions. For example, the exemplary portion 702 tests whether CDS is allowed and uses PLO to update the queue if CDS is disabled.

Figure 8:
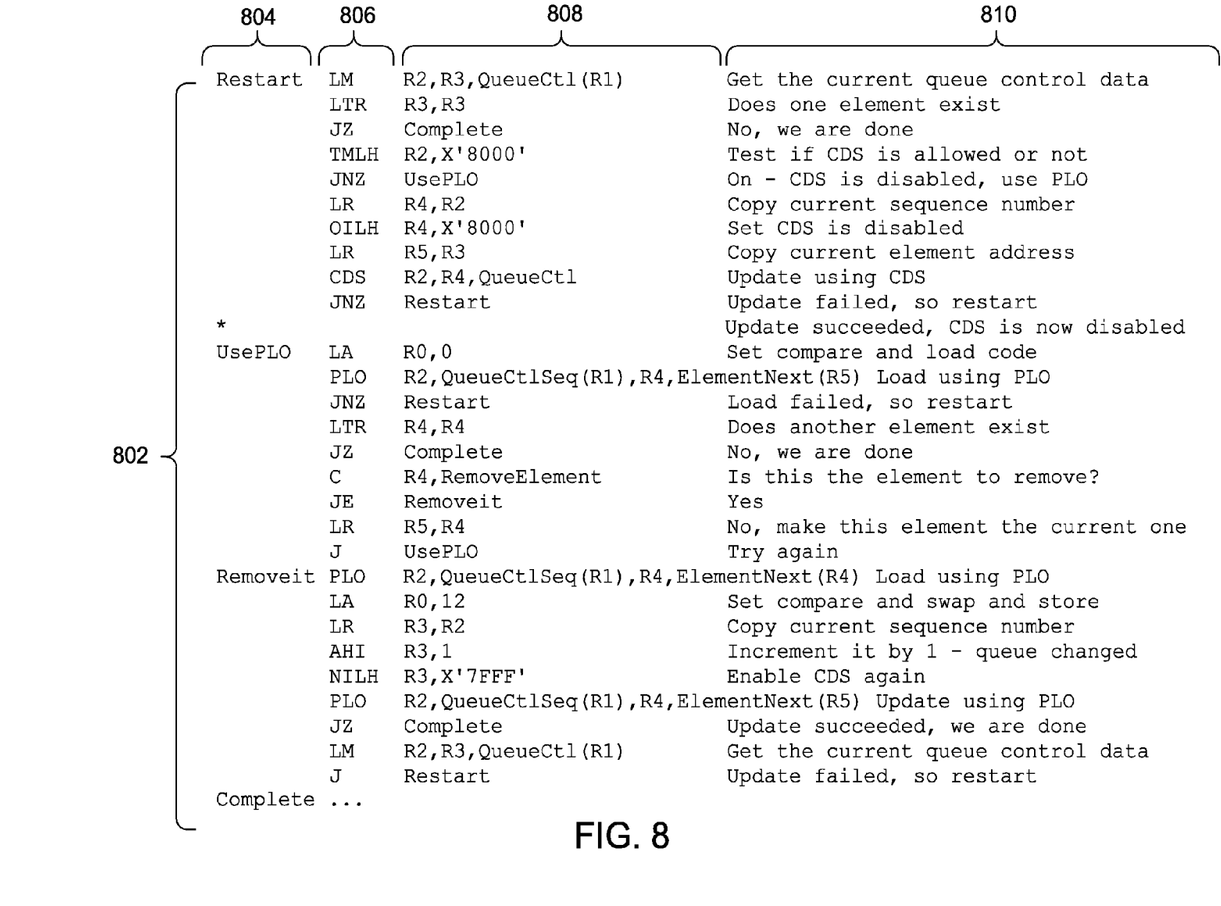
FIG. 8 illustrates an exemplary portion of the application, for finding and removing a specific element from the queue when the queue includes more than one element, according to one embodiment of the invention.

FIG. 8 illustrates an exemplary portion 802 of the application 150, for finding and removing a specific element from the queue when the queue includes more than one element, according to one embodiment of the invention. The exemplary portion 802 of the application 150 includes destination labels 804, opcodes 806, operands 808, and associated descriptions 810. The exemplary portion 802 removes the specific element from the queue based on the protocol for intermixing PLO and conditional swapping instructions. For example, the exemplary portion 802 tests whether CDS is allowed and uses PLO to update the queue if CDS is disabled. Further, the exemplary portion 802 increments the sequence number upon updating the queue in CDS mode.

Advantageously, embodiments of the invention provide techniques for intermixing, in an application, different types of machine instructions supported by a computer processor. Each type of machine instruction may operate on a data structure supported by the computer processor. One embodiment of the invention provides a protocol for intermixing the different types of machine instructions. The protocol may specify one or more constraints to be fulfilled when intermixing the different types of machine instructions in the application, in order to avoid unpredictable results from intermixing the different types of machine instructions. By adhering to the protocol, the application may intermix different types of machine instructions without leading to unpredictable results in updating data structures. Accordingly, the application may intermix the different types of machine instructions to more efficiently access and/or manipulate the data structures.

While the foregoing is directed to embodiments of the present invention, other and further embodiments of the invention may be devised without departing from the basic scope thereof, and the scope thereof is determined by the claims that follow.

What is claimed is:

1. A computer-implemented method for intermixing conditional swapping (CNS) instructions and Perform Locked Operation (PLO) instructions, wherein the method comprises:
   executing a CNS instruction to set a PLO/CNS mode flag to a PLO mode, wherein the PLO/CNS mode flag specifies a type of a predefined set of instructions for updating a header of a queue;
   upon determining that a serializing update is made to the queue, incrementing a sequence value by operation of one or more computer processors; and
   executing a PLO instruction to retrieve data from the queue in the PLO mode based on the sequence value.

2. The computer-implemented method of claim 1, wherein the serializing update comprises adding a data element to a position in the queue other than the head of the queue in PLO mode.

3. The computer-implemented method of claim 1, wherein the serializing update comprises deleting a data element from a position in the queue other than the head of the queue in PLO mode.

4. The computer-implemented method of claim 1, wherein the serializing update comprises switching from the PLO mode to a CNS mode via a PLO instruction.

5. The computer-implemented method of claim 1, wherein the serializing update does not comprise adding a data element to the head of the queue.

6. The computer-implemented method of claim 1, wherein the serializing update does not comprise removing a data element from the head of the queue.

7. The computer-implemented method of claim 1, wherein the header of the queue identifies a data element at the head of the queue, and whereby the CNS instruction and the PLO instruction are intermixed.

8. A computer program product for intermixing conditional swapping (CNS) instructions and Perform Locked Operation (PLO) instructions, comprising:
   a computer-readable storage medium having computer-readable program code embodied therewith, the computer-readable program code comprising:

computer-readable program code configured to execute a CNS instruction to set a PLO/CNS mode flag to a PLO mode, wherein the PLO/CNS mode flag specifies a type of a predefined set of instructions for updating a header of a queue;

computer-readable program code configured to increment a sequence value upon determining that a serializing update is made to the queue; and computer-readable program code configured to execute a PLO instruction to retrieve data from the queue in the PLO mode based on the sequence value.

9. The computer program product of claim 8, wherein the serializing update comprises adding a data element to a position in the queue other than the head of the queue in PLO mode.

10. The computer program product of claim 8, wherein the serializing update comprises deleting a data element from a position in the queue other than the head of the queue in PLO mode.

11. The computer program product of claim 8, wherein the serializing update comprises switching from the PLO mode to a CNS mode via a PLO instruction.

12. The computer program product of claim 8, wherein the serializing update does not comprise adding a data element to the head of the queue.

13. The computer program product of claim 8, wherein the serializing update does not comprise removing a data element from the head of the queue.

14. The computer program product of claim 8, wherein the header of the queue identifies a data element at the head of the queue, and whereby the CNS instruction and the PLO instruction are intermixed.

15. A system, comprising:
one or more computer processors; and
a memory containing a program, which when executed by the one or more computer processors is configured to perform an operation for intermixing conditional swapping (CNS) instructions and Perform Locked Operation (PLO) instructions, comprising:
  executing a CNS instruction to set a PLO/CNS mode flag to a PLO mode, wherein the PLO/CNS mode flag specifies a type of a predefined set of instructions for updating a header of a queue;
  upon determining that a serializing update is made to the queue, incrementing a sequence value; and
  executing a PLO instruction to retrieve data from the queue in the PLO mode based on the sequence value.

16. The system of claim 15, wherein the serializing update comprises adding a data element to a position in the queue other than the head of the queue in PLO mode.

17. The system of claim 15, wherein the serializing update comprises deleting a data element from a position in the queue other than the head of the queue in PLO mode.

18. The system of claim 15, wherein the serializing update comprises switching from the PLO mode to a CNS mode via a PLO instruction.

19. The system of claim 15, wherein the serializing update does not comprise adding a data element to the head of the queue.

20. The system of claim 15, wherein the serializing update does not comprise removing a data element from the head of the queue.

* * * * *